(12) United States Patent
Dey et al.

(10) Patent No.: US 12,382,078 B2
(45) Date of Patent: Aug. 5, 2025

(54) PHASE DETECTION DATA ENCODING TECHNIQUES

(71) Applicant: QUALCOMM Incorporated, San Diego, CA (US)

(72) Inventors: Abhijeet Dey, Bengaluru (IN); Micha Galor Gluskin, San Diego, CA (US); Joby Abraham, Bangalore (IN); Shrey Shailesh Gadiya, Bangalore (IN); Raghavendra Prasad Nerlige Onkarappa, Bangalore (IN); Shridhar Prakash Patil, Chikkodi (IN)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 18/327,682

(22) Filed: Jun. 1, 2023

(65) Prior Publication Data

US 2024/0406428 A1    Dec. 5, 2024

(51) Int. Cl.
| | |
|---|---|
| *H04N 19/46* | (2014.01) |
| *H04N 19/136* | (2014.01) |
| *H04N 19/80* | (2014.01) |
| *H04N 23/60* | (2023.01) |
| *H04N 23/67* | (2023.01) |
| *H04N 23/80* | (2023.01) |

(52) U.S. Cl.
CPC ........... *H04N 19/46* (2014.11); *H04N 19/136* (2014.11); *H04N 19/80* (2014.11); *H04N 23/665* (2023.01); *H04N 23/672* (2023.01); *H04N 23/80* (2023.01)

(58) Field of Classification Search
CPC ...... H04N 19/136; H04N 19/46; H04N 19/80; H04N 23/665; H04N 23/672; H04N 23/80; H04N 25/704
See application file for complete search history.

(56) References Cited

U.S. PATENT DOCUMENTS

2023/0041630 A1    2/2023  Galor Gluskin et al.

OTHER PUBLICATIONS

International Search Report and Written Opinion—PCT/US2024/022863—ISA/EPO—Jul. 15, 2024.

*Primary Examiner* — Antoinette T Spinks
(74) *Attorney, Agent, or Firm* — Qualcomm/Norton Rose Fulbright US LLP

(57) ABSTRACT

This disclosure provides systems, methods, and devices for image signal processing that support compression of phase detection (PD) data. In a first aspect, a method of image processing includes receiving image data and first phase detection data corresponding to the image data; determining a first channel of the first phase detection data and a second channel of the first phase detection data; and coding the first phase detection data to determine second phase detection data by separately coding the first channel and the second channel. Other aspects and features are also claimed and described.

28 Claims, 10 Drawing Sheets

PHASE DETECTION DATA ENCODING TECHNIQUES

TECHNICAL FIELD

Aspects of the present disclosure relate generally to image processing, and more particularly, to data compression for image processing. Some features may enable and provide improved image processing, including improved compression of phase detection (PD) data.

INTRODUCTION

Image capture devices are devices that can capture one or more digital images, whether still images for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The amount of image data captured by an image sensor has increased through subsequent generations of image capture devices. The amount of information captured by an image sensor is related to a number of pixels in an image sensor of the image capture device, which may be measured as a number of megapixels indicating the number of millions of sensors in the image sensor. For example, a 12-megapixel image sensor has 12 million pixels. Higher megapixel values generally represent higher resolution images that are more desirable for viewing by the user.

The increasing amount of image data captured by the image capture device has some negative effects that accompany the increasing resolution obtained by the additional image data. Additional image data increases the amount of processing performed by the image capture device in determining image frames and videos from the image data, as well as in performing other operations related to the image data. For example, the image data may be processed through several processing blocks for enhancing the image before the image data is displayed to a user on a display or transmitted to a recipient in a message. Each of the processing blocks consumes additional power proportional to the amount of image data, or number of megapixels, in the image capture. The additional power consumption may shorten the operating time of an image capture device using battery power, such as a mobile phone.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One cause for the shortened battery life of mobile devices operating as image capture devices is power consumed transmitting data through data buses. Larger, higher-resolution image sensors capture larger amounts of data. The larger amounts of data are transmitted through data busses, in which the transmission of each bit consumes power. Power consumption may be reduced by compressing certain data before transmission over a data bus, which reduces the amount of data transmitted over the data bus.

In some aspects, compression of phase detection data is disclosed, which can reduce the amount of data transmitted through components of a mobile device as part of an image capture operation. The phase detection data may include multiple channels, such as one or more of a left channel, a right channel, an up channel, and/or a down channel. Each channel is a representation of the field of view of a camera with a different offset. When the camera is at the focal point for the scene (referred to as "in focus"), the different channels contain similar data. When the camera is out of focus, the different channels may contain larger differences than when the camera is in focus. The phase detection data may be compressed based on correlation (or similarity) of data within the same channel (same-channel correlation) or between channels (cross-channel correlation).

The use of phase detection data compression may reduce an amount of data transmitted over a data bus within the image capture device. For example, the compressed PD data may be transmitted between an image sensor and an image signal processor, between an image sensor and a memory, between an image signal processor and a memory, between an image signal processor and a display, between an image signal processor and a central processing unit (CPU), or between other components of a mobile device. Each time the data is transmitted power may be saved by the compressed PD data containing less bits for transfer. Additionally, power consumption may be reduced by reducing the amount of data stored and retrieved from memory because the compressed PD data has a reduced number of bits to store and retrieve. Further, power consumption may be reduced by reducing the amount of data to be processed in image processing, including reducing an amount of data to analyze during calculation of PD statistics for autofocus operations.

Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

In one aspect of the disclosure, a method for image processing includes receiving image data and first phase detection data corresponding to the image data; determining a first channel of the first phase detection data and a second channel of the first phase detection data; and coding the first phase detection data to determine second phase detection data by separately coding the first channel and the second channel.

In an additional aspect of the disclosure, an apparatus includes at least one processor and a memory coupled to the at least one processor. The at least one processor is configured to perform operations including receiving image data and first phase detection data corresponding to the image data; determining a first channel of the first phase detection data and a second channel of the first phase detection data; and coding the first phase detection data to determine second phase detection data by separately coding the first channel and the second channel.

In an additional aspect of the disclosure, an apparatus includes means for receiving image data and first phase detection data corresponding to the image data; means for determining a first channel of the first phase detection data and a second channel of the first phase detection data; and means for coding the first phase detection data to determine second phase detection data by separately coding the first channel and the second channel.

In an additional aspect of the disclosure, a non-transitory computer-readable medium stores instructions that, when executed by a processor, cause the processor to perform operations. The operations include receiving first image data comprising first image data comprising one or more image frames;

Methods of image processing described herein may be performed by an image capture device and/or performed on image data captured by one or more image capture devices.

Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
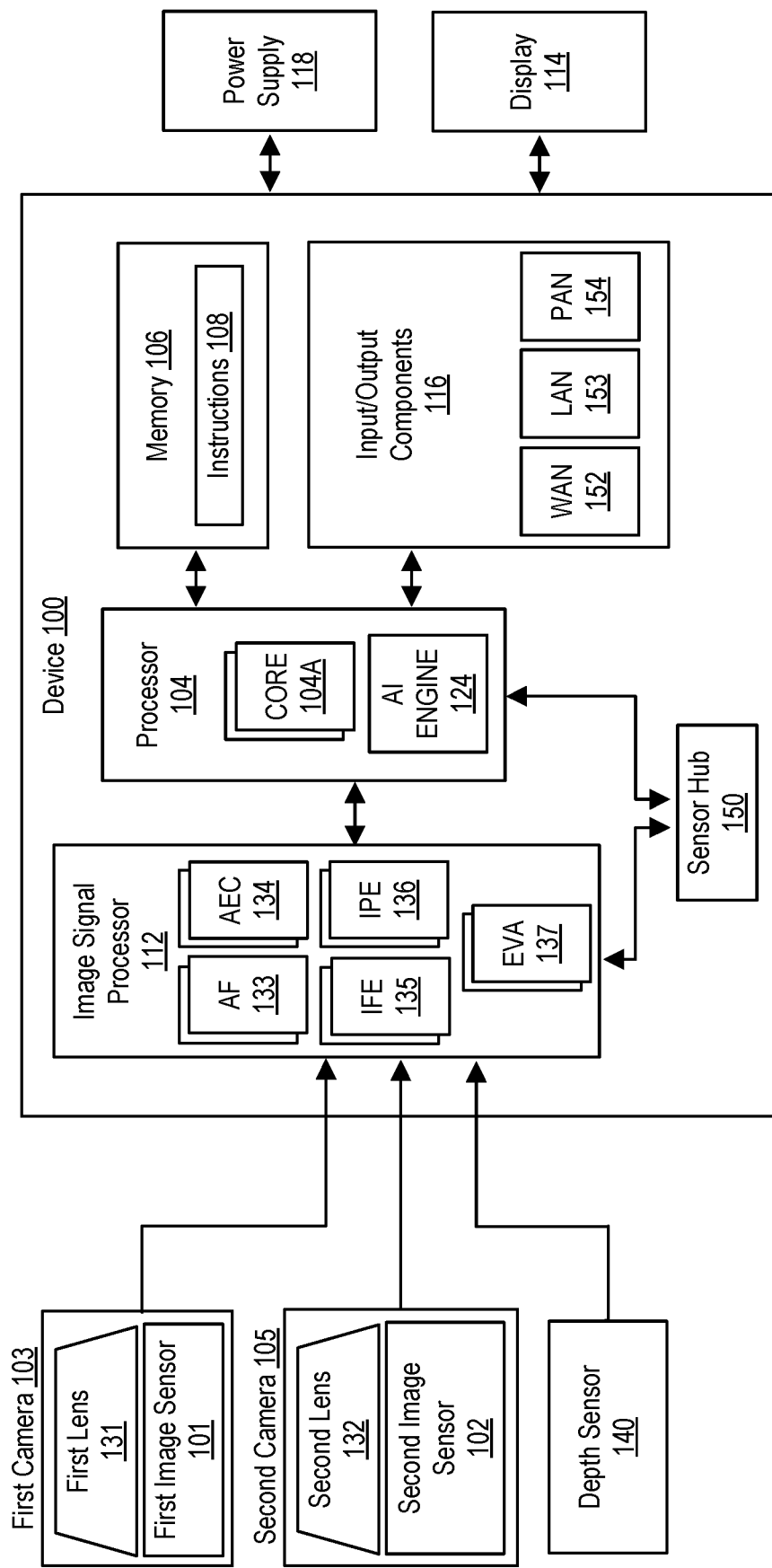
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing, including techniques for compressing phase detection (PD) data. Phase detection data may include multiple channels of data recorded by different sets of elements from an image sensor, in which the different channels of data represent a field of view of the camera captured from different locations. The phase detection data may be compressed with lossless compression techniques.

Particular implementations of the subject matter described in this disclosure may be implemented to realize one or more of the following potential advantages or benefits. In some aspects, the present disclosure provides techniques for reducing power consumption during image capture operations and/or image processing operations and also for reducing data size required in a memory or buffer. Example operations implementing phase data compression to six natural images and standard TE42 and ISO charts across varying lens position for different PD-sensors (e.g., 2PD, QPD, Sparse-PD) resulted in an average 42.85% reduction of PD-pixel bandwidth across various use-cases. An average of 1.09 Gbps of bandwidth savings was achieved for a 16MP-14BPP-30FPS dual-camera implementation.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

An example device for capturing image frames using one or more image sensors, such as a smartphone, may include a configuration of one, two, three, four, or more camera modules on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames (such as through a bus) in a memory and/or provide the output image frames to processing circuitry (such as an applications processor). The processing circuitry may perform further processing, such as for encoding, storage, transmission, or other manipulation of the output image frames.

As used herein, a camera module may include the image sensor and certain other components coupled to the image sensor used to obtain a representation of a scene in image data comprising an image frame. For example, a camera module may include other components of a camera, including a shutter, buffer, or other readout circuitry for accessing individual pixels of an image sensor. In some embodiments, the camera module may include one or more components including the image sensor included in a single package with an interface configured to couple the camera module to an image signal processor or other processor through a bus.

Figure 13:
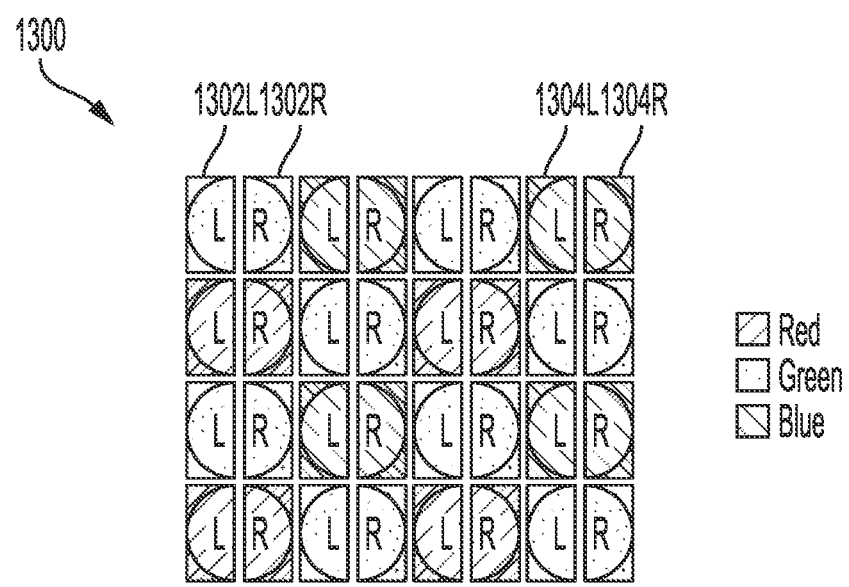
FIG. 13 is a two-channel phase detection (PD) sensor according to some embodiments of the disclosure.

FIG. 1 shows a block diagram of a device 100 for performing image capture from one or more image sensors. The device 100 may include, or otherwise be coupled to, an image signal processor (e.g., ISP 112) for processing image frames from one or more image sensors, such as a first image sensor 101, a second image sensor 102, and a depth sensor 140. One example of the first image sensor 101 and second image sensor 102 is shown in FIG. 13. In some implementations, the device 100 also includes or is coupled to a processor 104 and a memory 106 storing instructions 108 (e.g., a memory storing processor-readable code or a non-transitory computer-readable medium storing instructions). The device 100 may also include or be coupled to a display 114 and components 116. Components 116 may be used for interacting with a user, such as a touch screen interface and/or physical buttons.

Components 116 may also include network interfaces for communicating with other devices, including a wide area network (WAN) adaptor (e.g., WAN adaptor 152), a local area network (LAN) adaptor (e.g., LAN adaptor 153), and/or a personal area network (PAN) adaptor (e.g., PAN adaptor 154). A WAN adaptor 152 may be a 4G LTE or a 5G NR wireless network adaptor. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna, including multiple antennas configured for primary and diversity reception and/or configured for receiving specific frequency bands. In some embodiments, antennas may be shared for communicating on different networks by the WAN adaptor 152, LAN adaptor 153, and/or PAN adaptor 154. In some embodiments, the WAN adaptor 152, LAN adaptor 153, and/or PAN adaptor 154 may share circuitry and/or be packaged together, such as when the LAN adaptor 153 and the PAN adaptor 154 are packaged as a single integrated circuit (IC).

The device 100 may further include or be coupled to a power supply 118 for the device 100, such as a battery or an adaptor to couple the device 100 to an energy source. The device 100 may also include or be coupled to additional features or components that are not shown in FIG. 1. In one example, a wireless interface, which may include a number of transceivers and a baseband processor in a radio frequency front end (RFFE), may be coupled to or included in WAN adaptor 152 for a wireless communication device. In a further example, an analog front end (AFE) to convert analog image data to digital image data may be coupled between the first image sensor 101 or second image sensor 102 and processing circuitry in the device 100. In some embodiments, AFEs may be embedded in the ISP 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, which is a device configured for measuring rotation, orientation, and/or angular velocity to generate motion data. Another example non-camera sensor is an accelerometer, which is a device configured for measuring acceleration, which may also be used to determine velocity and distance traveled by appropriately integrating the measured acceleration. In some aspects, a gyroscope in an electronic image stabilization system (EIS) may be coupled to the sensor hub. In another example, a non-camera sensor may be a global positioning system (GPS) receiver, which is a device for processing satellite signals, such as through triangulation and other techniques, to determine a location of the device 100. The location may be tracked over time to determine additional motion information, such as velocity and acceleration. The data from one or more sensors may be accumulated as motion data by the sensor hub 150. One or more of the acceleration, velocity, and/or distance may be included in motion data provided by the sensor hub 150 to other components of the device 100, including the ISP 112 and/or the processor 104.

The ISP 112 may receive captured image data and/or phase detection (PD). In one embodiment, a local bus connection couples the ISP 112 to the first image sensor 101 and second image sensor 102 of a first camera 103 and second camera 105, respectively. In another embodiment, a wire interface couples the ISP 112 to an external image sensor. In a further embodiment, a wireless interface couples the ISP 112 to the first image sensor 101 or second image sensor 102. The transmission of data between an image sensor and the ISP 112 may be formatted as image data (e.g., multiple channels of elements within an image sensor summed together, such as a summation of a L- and R-channel). The image data may correspond to rows of elements in the image sensor with each element being a column. PD data may be embedded with the image data, in which an end of each sensor line includes a binned down version of each channel separately encoded (e.g., as L- and R-channel) (with binning in the horizontal and/or vertical dimension to fit a standard blanking interval (SBI)).

The first image sensor 101 and the second image sensor 102 are configured to capture image data representing a scene in the field of view of the first camera 103 and second camera 105, respectively. In some embodiments, the first camera 103 and/or second camera 105 output analog data, which is converted by an analog front end (AFE) and/or an analog-to-digital converter (ADC) in the device 100 or embedded in the ISP 112. In some embodiments, the first camera 103 and/or second camera 105 output digital data. The digital image data may be formatted as one or more image frames, whether received from the first camera 103 and/or second camera 105 or converted from analog data received from the first camera 103 and/or second camera 105.

The first camera 103 may include the first image sensor 101 and a first lens 131. The second camera may include the second image sensor 102 and a second lens 132. Each of the first lens 131 and the second lens 132 may be controlled by an associated an autofocus (AF) algorithm (e.g., AF 133) executing in the ISP 112, which adjusts the first lens 131 and the second lens 132 to focus on a particular focal plane located at a certain scene depth. The AF 133 may be assisted by depth data received from depth sensor 140. The first lens 131 and the second lens 132 focus light at the first image sensor 101 and second image sensor 102, respectively, through one or more apertures for receiving light, one or more shutters for blocking light when outside an exposure window, and/or one or more color filter arrays (CFAs) for filtering light outside of specific frequency ranges. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

Each of the first camera 103 and second camera 105 may be configured through hardware configuration and/or software settings to obtain different, but overlapping, field of views. In some configurations, the cameras are configured with different lenses with different magnification ratios that result in different fields of view for capturing different representations of the scene. The cameras may be configured such that a UW camera has a larger FOV than a W camera, which has a larger FOV than a T camera, which has a larger FOV than a UT camera. For example, a camera configured for wide FOV may capture fields of view in the range of 64-84 degrees, a camera configured for ultra-side FOV may capture fields of view in the range of 100-140 degrees, a camera configured for tele FOV may capture fields of view in the range of 10-30 degrees, and a camera configured for ultra-tele FOV may capture fields of view in the range of 1-8 degrees.

In some embodiments, one or more of the first camera 103 and/or second camera 105 may be a variable aperture (VA) camera in which the aperture can be adjusted to set a particular aperture size. Example aperture sizes include f/2.0, f/2.8, f/3.2, f/8.0, etc. Larger aperture values correspond to smaller aperture sizes, and smaller aperture values correspond to larger aperture sizes. A variable aperture (VA) camera may have different characteristics that produced different representations of a scene based on a current aperture size. For example, a VA camera may capture image data with a depth of focus (DOF) corresponding to a current aperture size set for the VA camera.

The ISP 112 processes image frames captured by the first camera 103 and second camera 105. While FIG. 1 illustrates the device 100 as including first camera 103 and second camera 105, any number (e.g., one, two, three, four, five, six, etc.) of cameras may be coupled to the ISP 112. In some aspects, depth sensors such as depth sensor 140 may be coupled to the ISP 112. Output from the depth sensor 140 may be processed in a similar manner to that of first camera 103 and second camera 105. Examples of depth sensor 140 include active sensors, including one or more of indirect Time of Flight (iToF), direct Time of Flight (dToF), light detection and ranging (LiDAR), mmWave, radio detection and ranging (RADAR), and/or hybrid depth sensors, such as structured light sensors. In embodiments without a depth sensor 140, similar information regarding depth of objects or a depth map may be determined from the disparity between first camera 103 and second camera 105, such as by using a depth-from-disparity algorithm, a depth-from-stereo algorithm, phase detection auto-focus (PDAF) sensors, or the like. In addition, any number of additional image sensors or image signal processors may exist for the device 100.

In some embodiments, the ISP 112 may execute instructions from a memory, such as instructions 108 from the memory 106, instructions stored in a separate memory coupled to or included in the ISP 112, or instructions provided by the processor 104. In addition, or in the alternative, the ISP 112 may include specific hardware (such as one or more integrated circuits (ICs)) configured to perform one or more operations described in the present disclosure. For example, the ISP 112 may include image front ends (e.g., IFE 135), image post-processing engines (e.g., IPE 136), auto exposure compensation (AEC) engines (e.g., AEC 134), and/or one or more engines for video analytics (e.g., EVA 137). An image pipeline may be formed by a sequence of one or more of the IFE 135, IPE 136, and/or EVA 137. In some embodiments, the image pipeline may be reconfigurable in the ISP 112 by changing connections between the IFE 135, IPE 136, and/or EVA 137. The AF 133, AEC 134, IFE 135, IPE 136, and EVA 137 may each include application-specific circuitry, be embodied as software or firmware executed by the ISP 112, and/or a combination of hardware and software or firmware executing on the ISP 112.

The memory 106 may include a non-transient or non-transitory computer readable medium storing computer-executable instructions as instructions 108 to perform all or a portion of one or more operations described in this disclosure. The instructions 108 may include a camera application (or other suitable application such as a messaging application) to be executed by the device 100 for photography or videography. The instructions 108 may also include other applications or programs executed by the device 100, such as an operating system and applications other than for image or video generation. Execution of the camera application, such as by the processor 104, may cause the device 100 to record images using the first camera 103 and/or second camera 105 and the ISP 112.

In addition to instructions 108, the memory 106 may also store image frames. The image frames may be output image frames stored by the ISP 112. The output image frames may be accessed by the processor 104 for further operations. In some embodiments, the device 100 does not include the memory 106. For example, the device 100 may be a circuit including the ISP 112, and the memory may be outside the device 100. The device 100 may be coupled to an external memory and configured to access the memory for writing output image frames for display or long-term storage. In some embodiments, the device 100 is a system-on-chip (SoC) that incorporates the ISP 112, the processor 104, the sensor hub 150, the memory 106, and/or components 116 into a single package.

In some embodiments, at least one of the ISP 112 or the processor 104 executes instructions to perform various operations described herein, including compression or decompression of phase detection (PD) data. For example, execution of the instructions can instruct the ISP 112 to begin or end capturing an image frame or a sequence of image frames, in which the capture includes the capture of phase detection (PD) data and compression and/or decompression of the PD data as described in embodiments herein. In some embodiments, the processor 104 may include one or more general-purpose processor cores 104A-N capable of executing instructions to control operation of the ISP 112. For example, the cores 104A-N may execute a camera application (or other suitable application for generating images or video) stored in the memory 106 that activate or deactivate the ISP 112 for capturing image frames and/or control the ISP 112 in the application of PD data compression to the image frames. The operations of the cores 104A-N and ISP 112 may be based on user input. For example, a camera application executing on processor 104 may receive a user command to begin a video preview display upon which a video comprising a sequence of image frames is captured and processed from first camera 103 and/or the second camera 105 through the ISP 112 for display and/or storage. Image processing to determine "output" or "corrected" image frames, such as according to techniques described herein, may be applied to one or more image frames in the sequence.

In some embodiments, the processor 104 may include ICs or other hardware (e.g., an artificial intelligence (AI) engine such as AI engine 124 or other co-processor) to offload certain tasks from the cores 104A-N. The AI engine 124 may be used to offload tasks related to, for example, face detection and/or object recognition performed using machine learning (ML) or artificial intelligence (AI). The AI engine 124 may be referred to as an Artificial Intelligence Processing Unit (AI PU). The AI engine 124 may include hardware configured to perform and accelerate convolution operations involved in executing machine learning algorithms, such as by executing predictive models such as artificial neural networks (ANNs) (including multilayer feedforward neural networks (MLFFNN), the recurrent neural networks (RNN), and/or the radial basis functions (RBF)). The ANN executed by the AI engine 124 may access predefined training weights for performing operations on user data. The ANN may alternatively be trained during operation of the image capture device 100, such as through reinforcement training, supervised training, and/or unsupervised training. In some other embodiments, the device 100 does not include the processor 104, such as when all of the described functionality is configured in the ISP 112.

In some embodiments, the display 114 may include one or more suitable displays or screens allowing for user interaction and/or to present items to the user, such as a preview of the output of the first camera 103 and/or second camera 105. In some embodiments, the display 114 is a touch-sensitive display. The input/output (I/O) components, such as components 116, may be or include any suitable mechanism, interface, or device to receive input (such as commands) from the user and to provide output to the user through the display 114. For example, the components 116 may include (but are not limited to) a graphical user interface (GUI), a keyboard, a mouse, a microphone, speakers, a squeezable bezel, one or more buttons (such as a power button), a slider, a toggle, or a switch.

While shown to be coupled to each other via the processor 104, components (such as the processor 104, the memory 106, the ISP 112, the display 114, and the components 116) may be coupled to each another in other various arrangements, such as via one or more local buses, which are not shown for simplicity. One example of a bus for interconnecting the components is a peripheral component interface (PCI) express (PCIe) bus.

While the ISP 112 is illustrated as separate from the processor 104, the ISP 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated to obtain improved images by using correlation within and between channels of the phase detection (PD) data to improve efficiency by reducing a number of bits used for storing the PD data and reducing bandwidth consumed when transferring the PD data, both of which can reduce power savings and improve battery operating time of a mobile device operating as an image capture device. One example method of operating one or more cameras, such as first camera 103 and/or second camera 105, is shown in FIG. 2 and described below.

Figure 2:
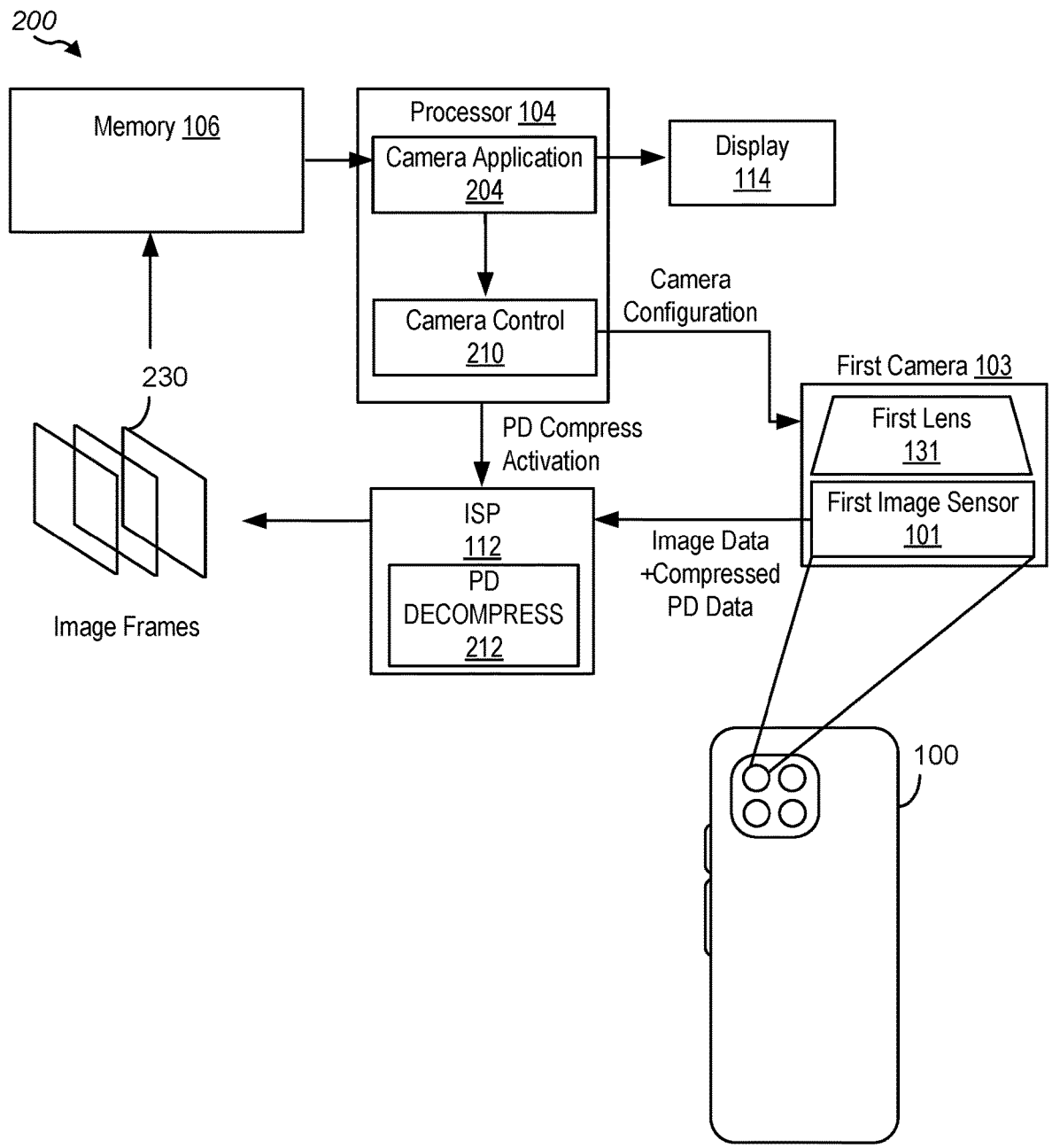
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosures. Processor 104 of system 200 may communicate with ISP 112 through a bi-directional bus and/or separate control and data lines. The processor 104 may control the first camera 103 through camera control 210. The camera control 210 may be a camera driver executed by the processor 104 for configuring the first camera 103, such as to active or deactivate image capture, configure exposure settings, activate or deactivate phase detection (PD) data compression, and/or configure aperture size. Camera control 210 may be managed by a camera application 204 executing on the processor 104. The camera application 204 provides settings accessible to a user such that a user can specify individual camera settings or select a profile with corresponding camera settings. Camera control 210 communicates with the first camera 103 to configure the first camera 103 in accordance with commands received from the camera application 204. The camera application 204 may be, for example, a photography application, a document scanning application, a messaging application, or other application that processes image data acquired from the first camera 103.

The camera configuration may include parameters that specify, for example, a frame rate, an image resolution, a readout duration, an exposure level, an aspect ratio, an aperture size, activation of a phase detection (PD) compression module, etc. The first camera 103 may apply the camera configuration and obtain image data representing a scene using the camera configuration. In some embodiments, the camera configuration may be adjusted to obtain different representations of the scene. For example, the processor 104 may execute a camera application 204 to instruct the first camera 103, through camera control 210, to set a first camera configuration for the first camera 103, to obtain first image data from the first camera 103 operating in the first camera configuration, to instruct the first camera 103 to set a second camera configuration for the first camera 103, and to obtain second image data from the first camera 103 operating in the second camera configuration.

In some embodiments in which the first camera 103 is a variable aperture (VA) camera system, the processor 104 may execute a camera application 204 to instruct the first camera 103 to configure to a first aperture size, obtain first image data from the first camera 103, instruct the first camera 103 to configure to a second aperture size, and obtain second image data from the first camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 corresponds to a larger aperture size than f/8.0.

The image data received from the first camera 103 may be processed in one or more blocks of the ISP 112 to determine output image frames 230 that may be stored in memory 106 and/or otherwise provided to the processor 104. The processor 104 may further process the image data to apply effects to the output image frames 230. Effects may include Bokeh, lighting, color casting, and/or high dynamic range (HDR) merging. In some embodiments, the effects may be applied in the ISP 112.

The output image frames 230 by the ISP 112 may include representations of the scene based on image data, in which the image data was captured with less power consumption by compressing phase detection (PD) data to reduce storage and bandwidth used on the device 100 in transferring data (e.g., the image data and compressed PD data) in the image capture device. The processor 104 may display these output image frames 230 to a user, and the improvements provided by the described processing implemented in the ISP 112 and/or processor 104 improve the user experience by reducing power consumption in the transfer of compressed PD data across data busses to allow users to use the device 100 for a longer period for viewing the image frames 230. For example, PD decompression module 212 in the ISP 112 may decompress compressed PD data received along with the image data from the first camera 103 when determining the output image frames 230. The PD decompression module 212 may be configured by a PD compression activation signal provided to the ISP 112 from the processor 104 and/or the camera 103. The activation signal may trigger operation of the PD decompression module 212 based on, for example, detecting that the first image sensor 101 is configured with a PD compression module. The activation signal may trigger operation of the PD decompression module 212 based on other criteria in addition to or in the alternative to the configuration of the image sensor 101. For example, the PD decompression module 212 may be activated when operating on battery power or when the battery charge is below a threshold level to allow PD compression to extend operation of the device 100 while on battery power.

Figure 3:
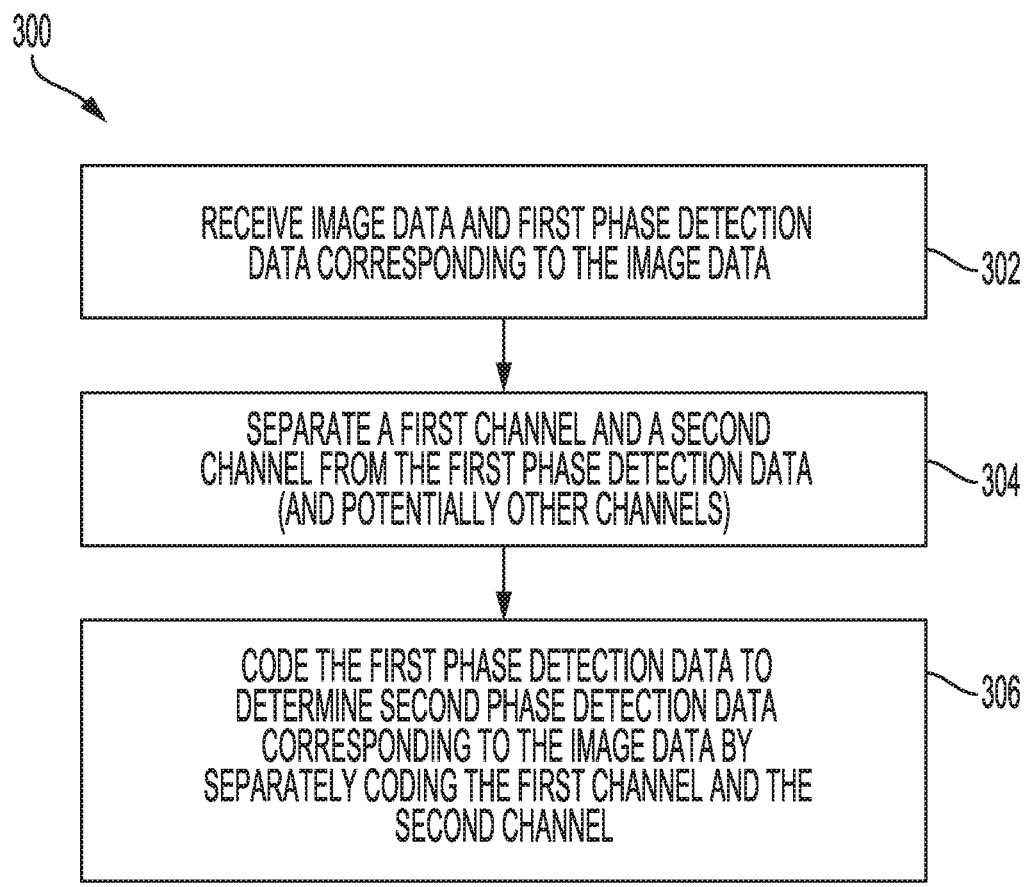
FIG. 3 shows a flow chart of an example method for coding (e.g., encoding or decoding) phase detection (PD) data according to some embodiments of the disclosure.

The system 200 of FIG. 2 may be configured to perform the operations described with reference to FIG. 3 to determine output image frames 230. FIG. 3 shows a flow chart of an example method for coding phase detection (PD) data according to some embodiments of the disclosure. Each of the operations described with reference to FIG. 3 may be performed by one or a combination of the processor 104 (including cores 104A-N and/or AI engine 124) and/or the ISP 112.

At block 302, first image data and first phase detection (PD) data is received from the image sensor, such as while the image sensor is configured with the camera configuration. The first image data and/or first PD data may be received, for example, through a bus coupled to the first camera 103 or from an analog front end (AFE) coupled to the first camera 103. The first image data and/or PD data may alternatively be received from a wireless camera, in which the image data is received through one or more of the WAN adaptor 152, the LAN adaptor 153, and/or the PAN adaptor 154. The first image data and/or first PD data may alternatively be received from a memory location or a network storage location, such as when the image data and/or PD data was previously captured and is now retrieved from memory 106 and/or a remote location through one or more of the WAN adaptor 152, the LAN adaptor 153, and/or the PAN adaptor 154. In some embodiments, the capture of image data and/or PD data may be initiated by a camera application executing on the processor 104, which causes camera control 210 to activate capture of image data and/or PD data by the first camera 103. The image data and/or PD data retrieved at block 302 may be then processed by the image sensor, such as for compressing the PD data, and or processed by the ISP 112 and/or processor 104 or other means for processing image data and/or PD data for decompressing the PD data according to the operations described in one or more of the following blocks.

At block 304, channels of the first PD data are separated into separate data. For example, the first PD data may be separated into a first channel comprising left PD data and a second channel comprising right PD data. In other examples, the first PD data may be separated into more than two channels.

At block 306, the first PD data is coded to determine second PD data (e.g., compressed PD data in a compression or encoding operation or decompressed PD data in a decompression or decoding operation). The coding may separately code the first channel and the second channel based on correlations identified within each channel and/or based on correlations identified between the channels. Same-channel coding may include computing differences between neighboring PD-data of same channel, which may include coding the differences using lossless encoding schemes (e.g., lempel ziv encoder) to encode PD-differences. Cross-channel coding may include computing difference between R-channel and corresponding L-channel (e.g., after normalizing the channels according to a channel-gain). In other examples, the cross-coding may include computing differences between other channels such as U, D, LU, LD, RU, and RD.

Figure 4:
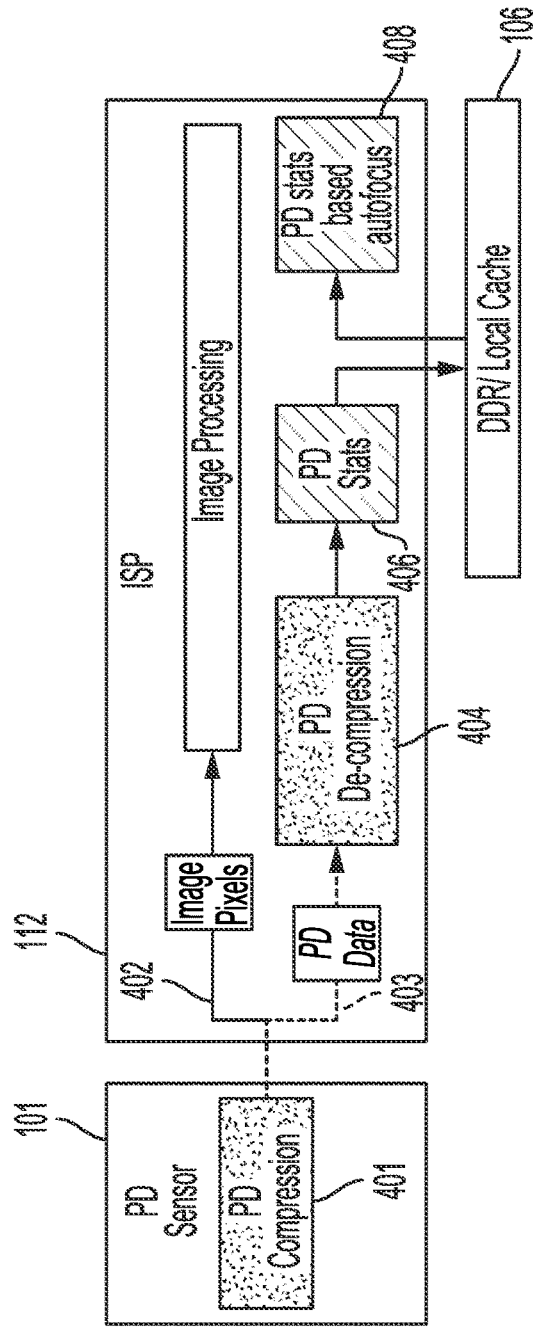
FIG. 4 is a block diagram illustrating one example data flow for processing compressed phase detection (PD) data in an image signal processor according to some embodiments of the disclosure.
Figure 5:
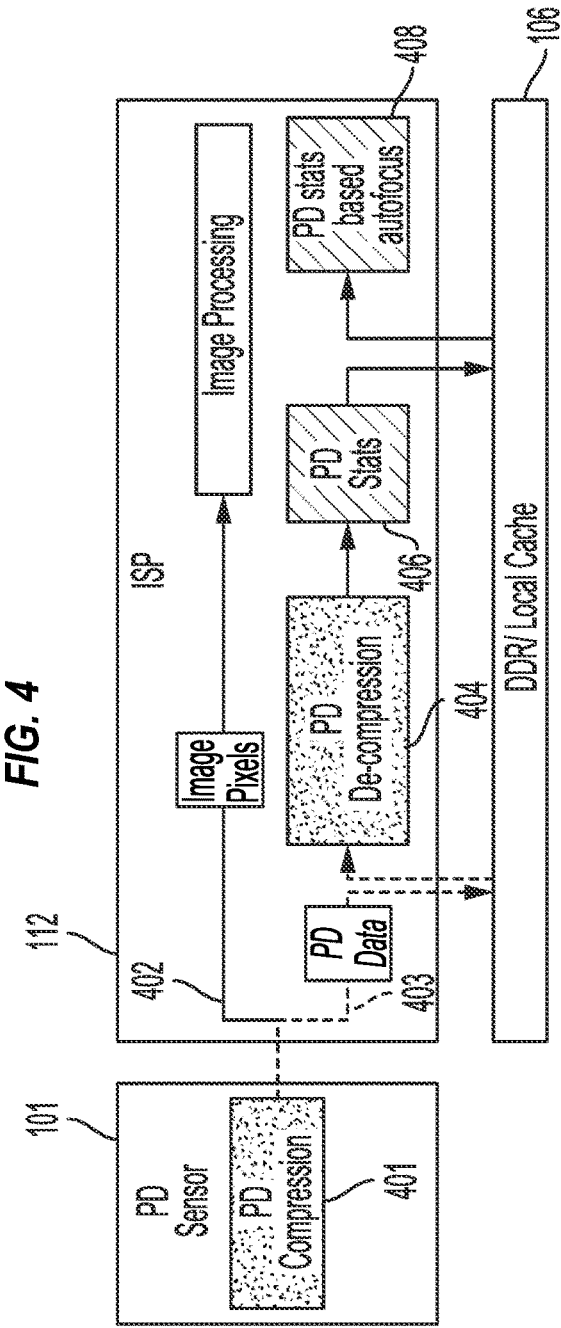
FIG. 5 is a block diagram illustrating another example data flow for processing compressed phase detection (PD) data in an image signal processor according to some embodiments of the disclosure.
Figure 6:
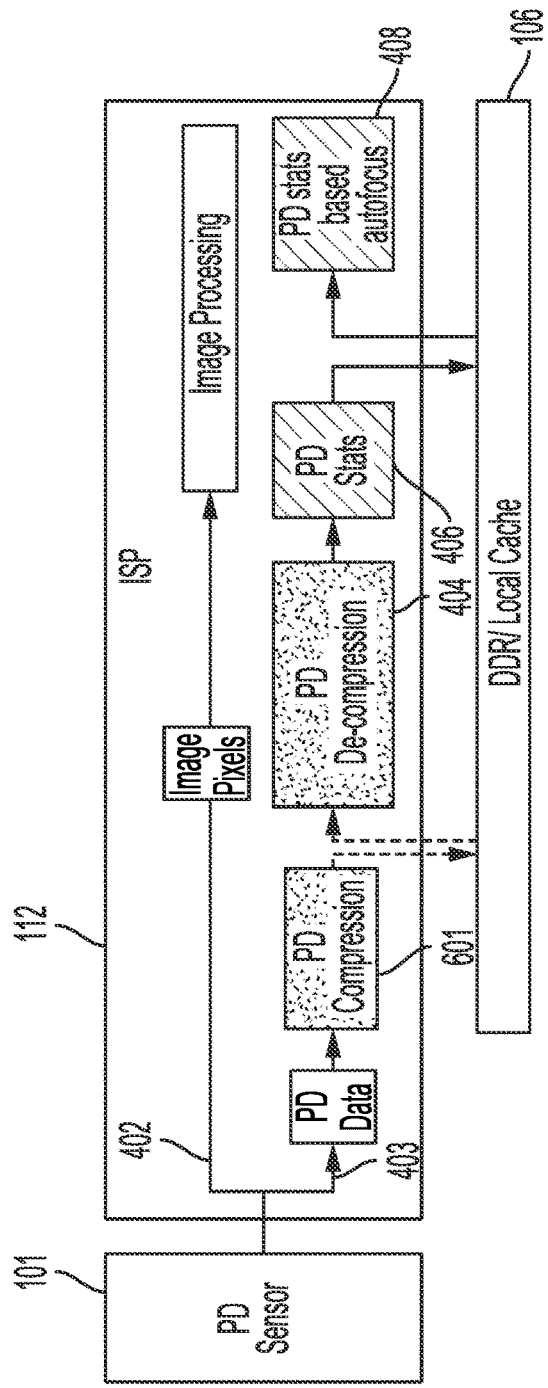
FIG. 6 is a block diagram illustrating an example data flow for compressing and processing phase detection (PD) data in an image signal processor according to some embodiments of the disclosure.
Figure 7:
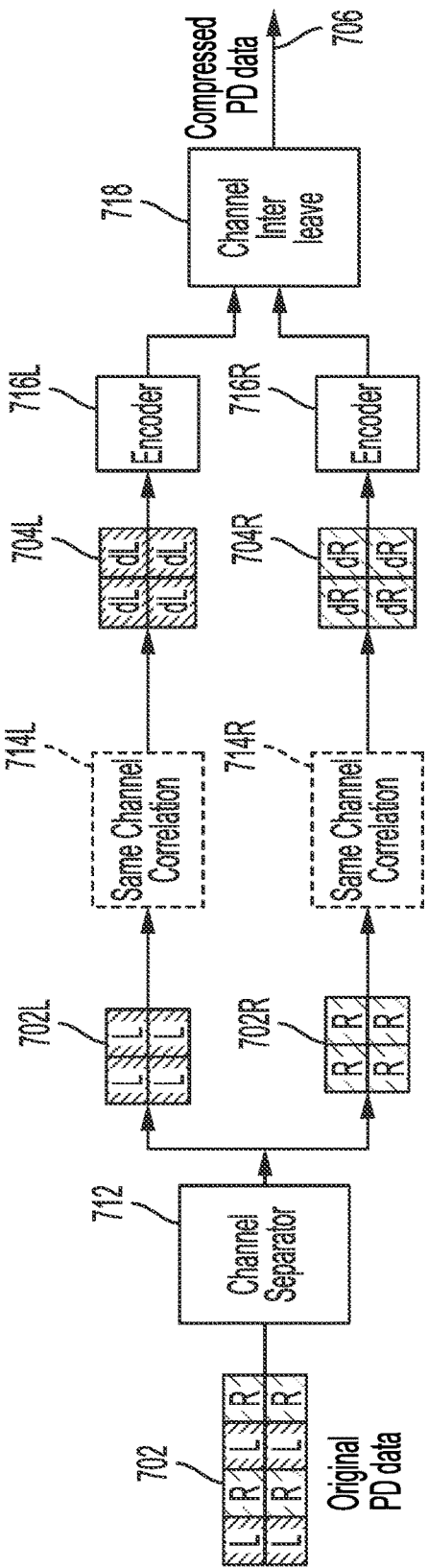
FIG. 7 is a block diagram illustrating one example of compressing phase detection (PD) data based on same-channel correlation according to some embodiments of the disclosure.
Figure 8:
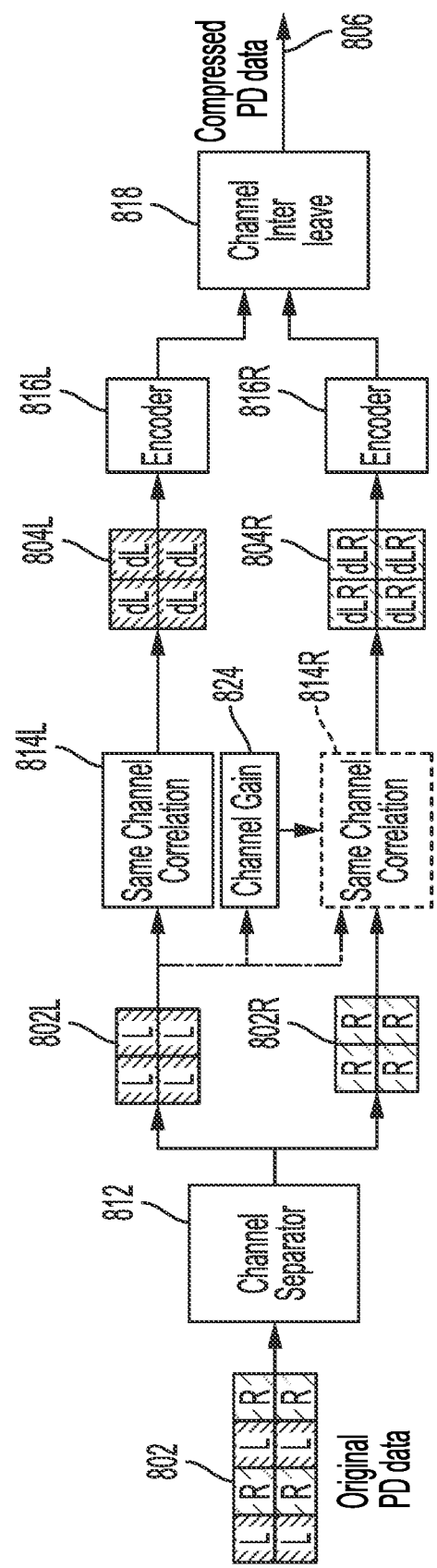
FIG. 8 is a block diagram illustrating one example of compressing phase detection (PD) data based on cross-channel correlation according to some embodiments of the disclosure.
Figure 9:
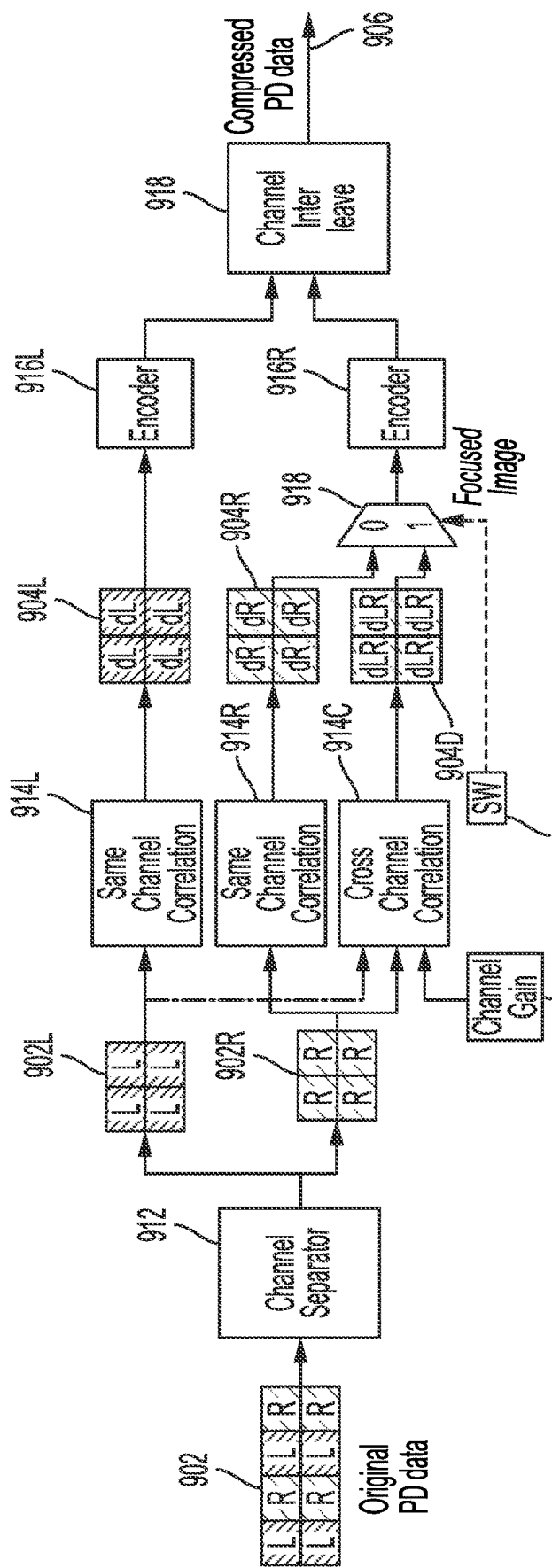
FIG. 9 is a block diagram illustrating one example of compressing phase detection (PD) data using a configurable data path according to some embodiments of the disclosure.

Several example configurations of an image capture device for implementing phase detection (PD) compression according to different embodiments of this disclosure are described with reference to FIG. 4, FIG. 5, FIG. 6, FIG. 7, FIG. 8, and FIG. 9. Different embodiments for the locations and timing of compression and decompression are shown in FIG. 4, FIG. 5, and FIG. 6. Different embodiments for the algorithm of compression and decompression are shown in FIG. 7, FIG. 8, and FIG. 9. The algorithms of FIG. 7, FIG. 8, and FIG. 9 may be applied as the locations and timing shown in FIG. 4, FIG. 4, or FIG. 6, or other embodiments.

FIG. 4 is a block diagram illustrating one example data flow for processing compressed phase detection (PD) data in an image signal processor. An image sensor 101, which may provide image data and phase detection (PD) data may include a phase detection (PD) compression module 401. The image sensor 101 outputs the image data and compressed PD data through a data bus to the ISP 112. The ISP 112 and/or the image sensor 101 may separate the image data 402 from the PD data 403. The image data 402 may be processed in further image processing logic circuitry. The PD data may be provided to PD decompression module 404, which may reverse the compression operation performed by the PD compression module 401 of the image sensor 101. The resulting decompressed PD code may be a lossless copy of the original data captured by the image sensor 101 or a lossy copy of the original data depending on the compression algorithm implemented in PD compression module 401 and PD decompression module 404. The output of the PD compression module 404 may be further processed in the ISP 112, such as by analyzing for PD statistics at PD statistics module 406, storing statistics and/or PD data in memory 106, and/or performing autofocus at autofocus module 408 based on the PD data and/or PD statistics.

Another configuration supporting a different data flow is shown in FIG. 5. FIG. 5 is a block diagram illustrating another example data flow for processing compressed phase detection (PD) data in an image signal processor. In the data flow of FIG. 5, the PD data may be buffered in the memory 106 for processing. The ISP 112 receives the PD data 403 and stores the PD data 403 in memory 106. The PD decompression module 404 retrieves the PD data from the memory 106, decompresses the PD data for use by PD statistics module 406. The PD statistics module 406 stores the PD decompressed data and/or the PD statistics in the memory 106. Autofocus module 408 may retrieve the PD statistics from memory 106 for adjusting the focus of a lens of a camera corresponding to the image sensor 101. In some embodiments, the PD decompression module 404 may output the decompressed PD data to the memory 106 for retrieval by the PD statistics module 406.

Another configuration supporting a different data flow is shown in FIG. 6. FIG. 6 is a block diagram illustrating an example data flow for compressing and processing phase detection (PD) data in an image signal processor. The ISP 112 configuration shown in FIG. 6 may support coupling with an image sensor 101 that does not include PD compression. The data received by ISP 112 may be separated into image data 402 and PD data 403. The PD data 403 may be compressed by PD compression block 601 in the ISP 112 and written to memory 106. The compressed PD data may be retrieved by PD decompression module 404 and decompressed for processing by PD statistics module 406 and resulting operation of the autofocus module 408 based on PD statistics.

In each of the example data flows of FIG. 4, FIG. 5, and FIG. 6 the memory 106 is shown external to the ISP 112. For example, the memory 106 may be on common die but separately located from the ISP 112. As another example, the memory 106 may be on a different die but packaged with the ISP 112. As a further example, the memory 106 may be on a different die and in a different package from the ISP 112. In some embodiments, the memory 106 may be internal to the ISP 112.

Example algorithms for the PD compression module 401 are shown in FIG. 7, FIG. 8, and FIG. 9. The algorithms may be reversed for implementation in the PD decompression module 404. Each of the algorithms of FIG. 7, FIG. 8, and FIG. 9 implement multiple techniques or processing steps, and each of the techniques or processing steps may be separately applied or combined in different embodiments for coding (e.g., compressing or decompressing) PD data.

One technique that may be applied in the coding of PD data is to identify same-channel correlation within the PD data to use for determining a coded representation of the PD data. FIG. 7 is a block diagram illustrating one manner of compressing phase detection (PD) data based on same-channel correlation according to some embodiments of the disclosure. Original PD data 702, such as may be output from individual elements of the image sensor 101, may include multiple channels of data. In some embodiments, the channels may be a left and a right channel. A channel separator 712 produces separate left PD data 702L and right PD data 702R, such as by de-interleaving the original PD data 702. The separation of left PD data 702L and right PD data 702R allows the channels to be separately coded.

Same-channel correlation modules 714L and 714R may identify correlations within the PD data 702L and PD data 702R, respectively, to determine correlation data 704L, which is a representation of the PD data 702L, and correlation data 704R, which is a representation of the PD data 702R. Encoder 716L may generate coded data by using the correlation data 704L to generate a representation of the PD data 702L that uses fewer bits. Encoder 716R likewise may generate coded data by using the correlation data 704R to generate a representation of the PD data 702R that uses fewer bits. A channel interleaver 718 may combine the outputs of encoders 716L and 716R to determine compressed PD data 706. That compressed PD data 706 may be stored in memory 106 or provided to PD statistics module 406 according to the example embodiments of FIG. 4, FIG. 5, or FIG. 6.

The same-channel correlation identification of FIG. 7 may be combined with cross-channel correlation identification to determine a representation of the PD data using fewer bits. Cross-channel correlation may provide further reductions in number of bits used to represent the PD data. One example implementation of cross-correlation is described with reference to FIG. 8. FIG. 8 is a block diagram illustrating one manner of compressing phase detection (PD) data based on cross-channel correlation according to some embodiments of the disclosure. Original PD data 802, such as may be output from individual elements of the image sensor 101, may include multiple channels of data. In some embodiments, the channels may be a left and a right channel. A channel separator 812 produces separate left PD data 802L and right PD data 802R, such as by de-interleaves the original PD data 802.

Same-channel correlation module 814L may identify correlations within the PD data 802L to determine correlation data 804L, which is a representation of the PD data 802L. The PD data 802L may be used as input to gain module 824 to apply a gain value for determining cross-channel correlation in cross-channel correlation module 814R. In some embodiments, the applied gain may be a gain map. In some embodiments, the gain values in gain module 824 may be configured by software. The gain value may represent, for example, an average value of the PD data 802L or some other correction factor to adjust for potentially different gain between the channels of PD data. The cross-channel correlation module 814R may determine correlation data 804R based on the PD data 802R, the PD data 802L, and the gain value from gain module 824. Similarity between the PD data 802L and PD data 802R may be used to reduce the amount of data used to represent PD data 802R. That similarity is represented in correlation data 804R. Encoder 816L may generate coded data by using the correlation data 804L to generate a representation of the PD data 802L that uses fewer bits. Encoder 816R likewise may generate coded data by using the correlation data 804R to generate a representation of the PD data 802R that uses fewer bits. A channel interleaver 818 may combine the outputs of encoders 816L and 816R to determine compressed PD data 806. That compressed PD data 806 may be stored in memory 106 or provided to PD statistics module 406 according to the example embodiments of FIG. 4, FIG. 5, or FIG. 6.

Although the example algorithm of FIG. 8 illustrates same-channel correlation applied to the left channel and cross-channel correlation applied to the right channel, the correlation determined for each channel may be reversed. For example, in some embodiments, same-channel correlation is applied to the right channel and cross-channel correlation is applied to the left channel. In some embodiments, whether same-channel or cross-channel correlation is applied to a channel of PD data may be configurable. For example, switches may be used to route one of the left channel or the right channel to a same-channel correlation module and the other of the left channel or the right channel to a cross-channel correlation module. In some embodiments, more than two channels of data may exist within the PD data and different combinations of same-channel and cross-channel correlation applied to the three or more channels of data.

In some embodiments, both cross-channel and same-channel correlation may be available to compress one or more channels of the PD data. FIG. 9 is one example illustration of a configurable path for at least one channel of PD data according to some embodiments of the disclosure. FIG. 9 is a block diagram illustrating one manner of compressing phase detection (PD) data using a configurable data path according to some embodiments of the disclosure. Original PD data 902, such as may be output from individual elements of the image sensor 101, may include multiple channels of data. In some embodiments, the channels may be a left and a right channel. A channel separator 912 produces separate left PD data 902L and right PD data 902R, such as by de-interleaving the original PD data 902. Same-channel correlation module 914L may identify correlations within the PD data 902L to determine correlation data 904L, which is a representation of the PD data 902L.

The right PD data 902R may be processed to identify same-channel correlation or cross-channel correlation based on control according to one or more criteria during the processing of the PD data 902R and PD data 902L. A same-channel correlation module 914R may operate similar to the same-channel correlation module 914L but on PD data 902R to produce correlation data 904R. A cross-channel correlation module 914C may operate similar to the cross-channel correlation module 814R with channel gain 824 of FIG. 8 to produce correlation data 904D. A multiplexer 918 receives the correlation data 904R and the correlation data 904D and outputs the output of one of the same-channel correlation module 914R or the cross-channel correlation module 914C to encoder 916R. The multiplexer 918 may comprise a network of switches configured to provide a configurable path that selects one of two inputs to the multiplexer 918 to couple to an output of the multiplexer 918.

The multiplexer 918 may receive a control signal to select one of the inputs from switch 920. The switch 920 may select one of the inputs based one or more criteria. An example criteria is whether the image is within a threshold amount (e.g., 5%, 10%, 15%, or 20%) of a focus position. Images that are in-focus or close to focus may exhibit high cross-channel correlation such that applying cross-channel correlation module 914C may improve efficiency of coding the PD data 902R and may reduce usage of bits for storing the compressed PD data. Images that are out of focus may exhibit low cross-channel correlation such that applying same-channel correlation module 914R may improve efficiency of coding the PD data 902R and may reduce usage of bits for storing the compressed PD data. The switch 920 may be controlled by software, such as a driver or an application, or by hardware, such as a microcontroller or an autofocus module.

Encoder 916L may generate coded data by using the correlation data 904L to generate a representation of the PD data 902L that uses fewer bits. Encoder 916R likewise may generate coded data by using the correlation data 804R to generate a representation of the PD data 902R that uses fewer bits. A multiplexer 918 may combine the outputs of encoders 916L and 916R to determine compressed PD data 906. That compressed PD data 906 may be stored in memory 106 or provided to PD statistics module 406 according to the example embodiments of FIG. 4, FIG. 5, or FIG. 6.

Figure 10:
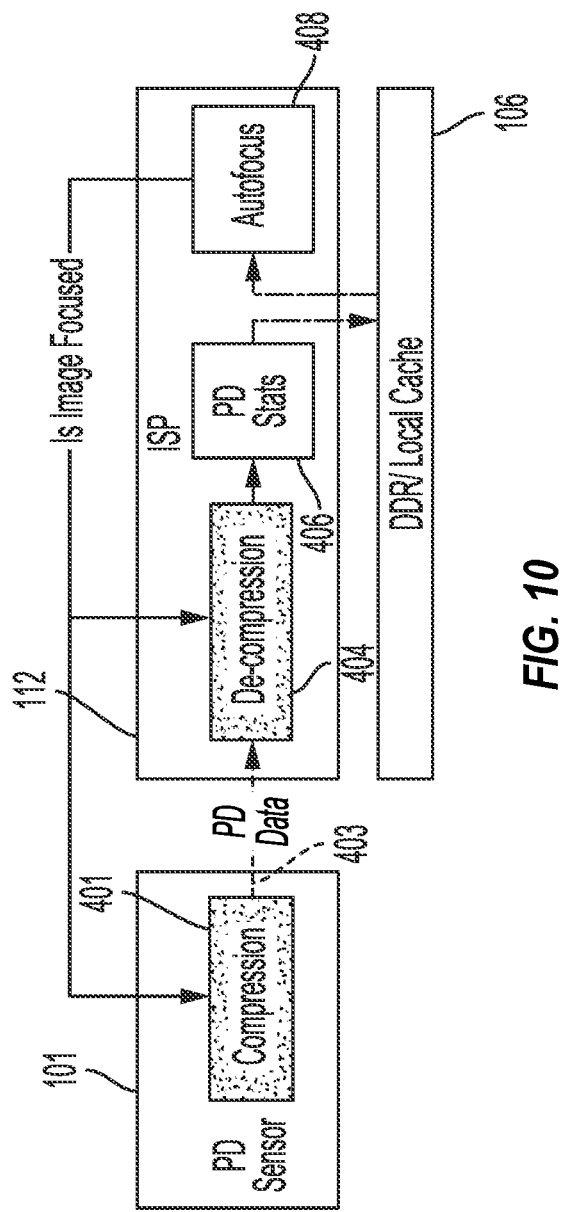
FIG. 10 is a block diagram illustrating feedback from an autofocus module for controlling compression and decompression of phase detection (PD) data according to some embodiments of the disclosure.
Figure 11:
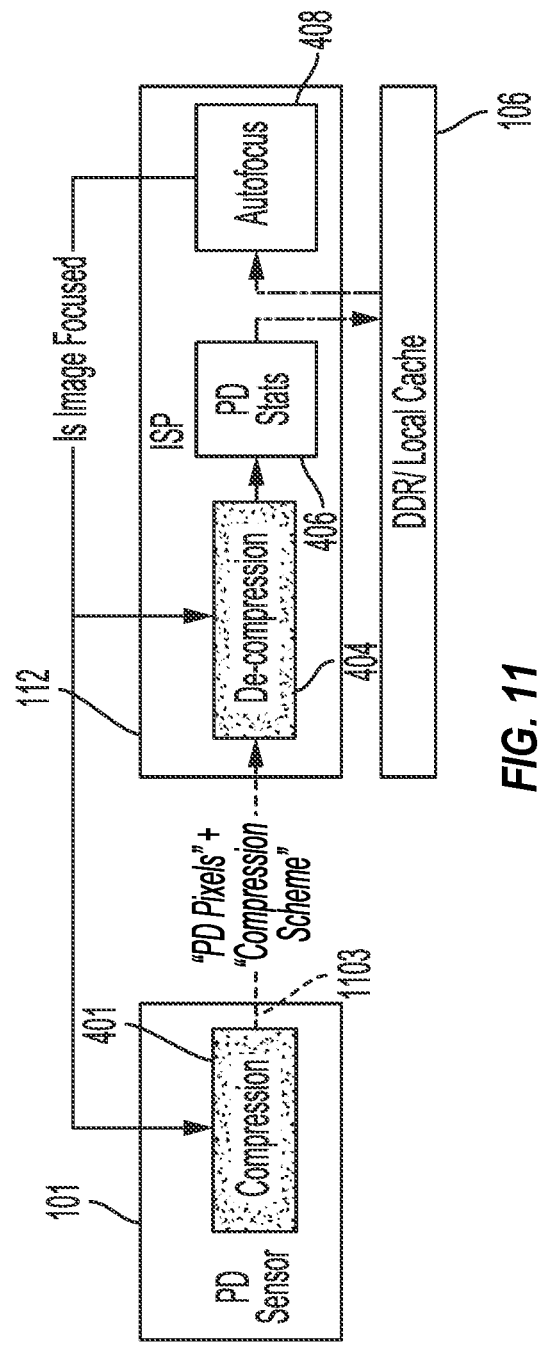
FIG. 11 is a block diagram illustrating feedback from an autofocus module for controlling compression and decompression of phase detection (PD) data according to some embodiments of the disclosure.

The control signal for the multiplexer 918 may be provided by a signal from an autofocus module and/or based on an output of an autofocus module. Example embodiments using autofocus information for feedback to control the compression and decompression operations is shown in FIG. 10 and FIG. 11. FIG. 10 is a block diagram illustrating feedback from an autofocus module for controlling compression and decompression of phase detection (PD) data according to some embodiments of the disclosure. A determination of whether the image is focused (e.g., whether the image is within a certain threshold range of the focus point) is output as feedback from autofocus module 408 to compression module 401 and to decompression module 404. The feedback may control the processing of one or more channels of PD data within the compression module 401 and the decompression module 404.

Another configuration for feedback is provided in FIG. 11. FIG. 11 is a block diagram illustrating feedback from an autofocus module for controlling compression and decompression of phase detection (PD) data according to some embodiments of the disclosure. Feedback from the autofocus module 408 is provided to the compression module 401 in FIG. 11. The compression module 401 transmits compressed PD data along with an indication of the compression scheme for one or more channels of the PD data. For example, the compression module 401 may indicate, along with a portion of the compressed PD data, whether the portion of the compressed PD data is encoded using same-channel correlation or cross-channel correlation. The correlation indication may be embedded within the compressed PD data and the combined indicator and compressed PD data transmitted over a data bus to the ISP 112. The correlation indication may alternatively be provided on a separate bus in parallel with the compressed PD data.

In some embodiments of the configuration shown in FIG. 10 and FIG. 11, the feedback is provided as a hardware signal. In some embodiments, the feedback may be provided to software (e.g., a camera application) that provides control information to the compression module 401 and/or decompression module 404.

Another technique for phase detection (PD) data compression includes removing some frequency information from the PD data. Phase detection auto focus (PDAF) operates by detecting phase as the visible translation between left and right images captured by one or more image sensors. Flat regions in the phase detection (PD) data (e.g., low frequency components) have reduced relevance in determining translation/phase and the focus point. Features such as edges, textures, and/or transitions in intensity (e.g., high frequency components) have higher relevance to detect phase and the focus point. Bandwidth may be reduced via suppression of low-frequency components (which may be through lossy compression). This compression may be performed through insertion of a high-pass filter in the data flow for one or more channels of the separated PD data, which is shown in one example of FIG. 12.

Figure 12:
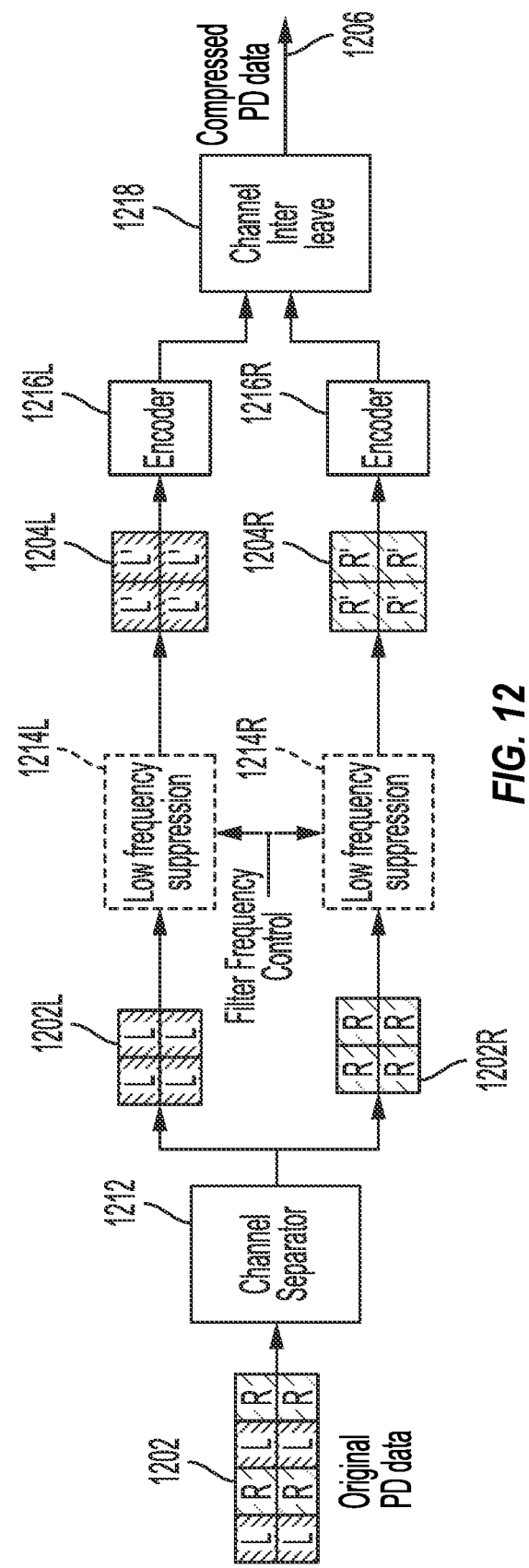
FIG. 12 is a block diagram illustrating one manner of compressing phase detection (PD) data based on frequency information according to some embodiments of the disclosure.

FIG. 12 is a block diagram illustrating one manner of compressing phase detection (PD) data based on frequency information according to some embodiments of the disclosure. Original PD data 1202, such as may be output from individual elements of the image sensor 101, may include multiple channels of data. In some embodiments, the channels may be a left and a right channel. A channel separator 1212 produces separate left PD data 1202L and right PD data 1202R, such as by de-interleaving the original PD data 1202.

Low-frequency suppression modules 1214L and 1214R may remove information in one or more frequency ranges within the PD data 1202L and PD data 1202R, respectively, to determine reduced data 1204L, which is a representation of the PD data 1202L, and reduced data 1204R, which is a representation of the PD data 1202R. Encoder 1216L may generate coded data by using the reduced data 1204L to generate a representation of the PD data 1202L that uses fewer bits. Encoder 1216R likewise may generate coded data by using the reduced data 1204R to generate a representation of the PD data 1202R that uses fewer bits. A channel interleaver 1218 may combine the outputs of encoder 1216L and encoder 1216R to determine compressed PD data 1206. That compressed PD data 1206 may be stored in memory 106 or provided to PD statistics module 406 according to the example embodiments of FIG. 4, FIG. 5, or FIG. 6.

The low-frequency suppression modules 1214L and 1214R may be filters. For example, high-pass filters may be applied to the PD data 1202L and PD data 1202R. As another example, a configurable high-pass filter or configurable band-pass filter may be applied to the PD data 1202L and PD data 1202R.

The filter removes low-frequency components of the PD data. In the reduced PD data 1204L and 1204R, information of redundant, flat regions are lost but information about high-frequency components are retained. In some embodiments, only redundant information is lost in this lossy compression, such that there is little to no impact to performance of a phase detection auto focus (PDAF) algorithm. In some embodiments, the filters may be configured through a filter-frequency-control signal to tune a cut-off frequency or other characteristic of the filter. The filter-frequency-control signal may be determined based on luminosity of the scene represented by the original PD data 1202. In high-light conditions, the filter is configured aggressively to provide high compression-ratio while reducing impact to the auto-focus algorithm. In low-light conditions, the filter is configured conservatively to reduce impact to the auto focus algorithm, although there may be less data reduction from less compression.

One example of a phase detection (PD) sensor is shown in FIG. 13. FIG. 13 is a two-channel phase detection (PD) sensor according to some embodiments of the disclosure. Image sensor 1300 includes an array of elements organized in rows and columns. Each element in a first channel, such as element 1302L and element 1304L, includes a corresponding element in a second channel, such as element 1302R and element 1304R, respectively. The elements in image sensor 1300 may have color filters corresponding to red, green, and blue colors. Although a 2PD sensor is shown in FIG. 13, other phase detection (PD) image sensors may be used with PD coding according to different embodiments, such as a QPD sensor or a sparse PD in a QFCA sensor.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to process data captured from an image sensor to code (e.g., encode or decode) phase detection (PD) data. The apparatus is further configured to perform operations comprising receiving image data and first phase detection data corresponding to the image data; determining a first channel of the first phase detection data and a second channel of the first phase detection data; and coding the first phase detection data to determine second phase detection data by separately coding the first channel and the second channel.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, coding the first phase detection data comprises coding the first phase detection data based on a same-channel correlation of at least one of the first channel or the second channel.

In a third aspect, in combination with one or more of the first aspect or the second aspect, coding the first phase detection data comprises coding the first phase detection data based on cross-channel correlation between the first channel and the second channel.

In a fourth aspect, in combination with one or more of the first aspect through the third aspect, coding the first phase detection data comprises: determining a focus state; and based on at least one criteria involving the focus state, coding the first phase detection data by: coding at least one of the first channel or the second channel based on same-channel correlation; and/or coding the at least one of the first channel or the second channel based on cross-channel correlation.

In a fifth aspect, in combination with one or more of the first aspect through the fourth aspect, coding the first phase detection data comprises: coding the first channel based on same-channel correlation; and coding the second channel based on cross-channel correlation of the second channel with the first channel.

In a sixth aspect, in combination with one or more of the first aspect through the fifth aspect, coding the first phase detection data comprises high-pass filtering lower-frequency components below a threshold frequency of the first phase detection data.

In a seventh aspect, in combination with one or more of the first aspect through the sixth aspect, the apparatus is further configured to perform operations comprising tuning a frequency response of the high-pass filtering by adjusting the threshold frequency based on one or more criteria.

In an eighth aspect, in combination with one or more of the first aspect through the seventh aspect, adjusting the threshold frequency comprises adjusting the threshold frequency based on luminosity of a scene represented by the first phase detection data.

In a ninth aspect, in combination with one or more of the first aspect through the eighth aspect, receiving the image data and the first phase detection data comprises receiving the image data and the first phase detection data from an image sensor.

In a tenth aspect, in combination with one or more of the first aspect through the ninth aspect, coding the first phase detection data comprises encoding the first phase detection data to determine the second phase detection data.

In an eleventh aspect, in combination with one or more of the first aspect through the tenth aspect, the apparatus is further configured to perform operations comprising transmitting the second phase detection data on a data bus to an image signal processor.

In a twelfth aspect, in combination with one or more of the first aspect through the eleventh aspect, receiving the image data and the first phase detection data comprises receiving the image data and the first phase detection data from an image sensor through a data bus.

In a thirteenth aspect, in combination with one or more of the first aspect through the twelfth aspect, coding the first phase detection data comprises decoding the first phase detection data to determine the second phase detection data.

In a fourteenth aspect, in combination with one or more of the first aspect through the thirteenth aspect, the apparatus is further configured to perform operations comprising determining a focus position based on the second phase detection data; and controlling a lens coupled to the image sensor based on determining the focus position.

In a fifteenth aspect, in combination with one or more of the first aspect through the fourteenth aspect, the apparatus includes an image sensor comprising a phase detection (PD) compression module, the image sensor configured to output image data and to output corresponding first phase detection (PD) data compressed by the PD compression module; a memory storing processor-readable code; and at least one processor coupled to the memory and to the image sensor, the at least one processor configured to execute the processor-readable code to perform operations comprising: receiving, by the at least one processor from the image sensor over a data bus, the image data and the first phase detection data; determining, by the at least one processor, a first channel of the first phase detection data and a second channel of the first phase detection data; and decompressing, by the at least one processor, the first phase detection data to determine second phase detection data by separately decoding the first channel and the second channel.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame," "modified image frame," and "corrected image frame" may refer to an image frame that has been processed by any of the disclosed techniques to adjust raw image data received from an image sensor. Further, aspects of the disclosed techniques may be implemented for processing image data received from image sensors of the same or different capabilities and characteristics (such as resolution, shutter speed, or sensor type). Further, aspects of the disclosed techniques may be implemented in devices for processing image data, whether or not the device includes or is coupled to image sensors. For example, the disclosed techniques may include operations performed by processing devices in a cloud computing system that retrieve image data for processing that was previously recorded by a separate device having image sensors.

Unless specifically stated otherwise as apparent from the following discussions, it is appreciated that throughout the present application, discussions using terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices. The use of different terms referring to actions or processes of a computer system does not necessarily indicate different operations. For example, "determining" data may refer to "generating" data. As another example, "determining" data may refer to "retrieving" data.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 3, 4, 5, 6, 7, 8, and 9 may be combined with one or more blocks (or operations) described with reference to another of the figures. For example, one or more blocks (or operations) of FIGS. 3, 4, 5, 6, 7, 8, and/or 9 may be combined with one or more blocks (or operations) of FIGS. 1-2. As another example, one or more blocks associated with FIGS. 4, 5, and 6 may be combined with one or more blocks (or operations) associated with FIGS. 7, 8, and 9.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving image data and first phase detection data corresponding to the image data;
   determining a first channel of the first phase detection data and a second channel of the first phase detection data; and
   coding the first phase detection data to determine second phase detection data by separately coding the first channel and the second channel, wherein coding the first phase detection data comprises:
      determining a focus state; and
      based on at least one criteria involving the focus state, coding the first phase detection data by:
         coding at least one of the first channel or the second channel based on same-channel correlation; or
         coding the at least one of the first channel or the second channel based on cross-channel correlation.

2. The method of claim 1, wherein coding the first phase detection data comprises coding the first phase detection data based on a same-channel correlation of at least one of the first channel or the second channel.

3. The method of claim 1, wherein coding the first phase detection data comprises coding the first phase detection data based on cross-channel correlation between the first channel and the second channel.

4. The method of claim 1, wherein coding the first phase detection data comprises:
   coding the first channel based on same-channel correlation; and
   coding the second channel based on cross-channel correlation of the second channel with the first channel.

5. The method of claim 1, wherein coding the first phase detection data comprises high-pass filtering lower-frequency components below a threshold frequency of the first phase detection data.

6. The method of claim 5, further comprising tuning a frequency response of the high-pass filtering by adjusting the threshold frequency based on one or more criteria.

7. The method of claim 6, wherein adjusting the threshold frequency comprises adjusting the threshold frequency based on luminosity of a scene represented by the first phase detection data.

8. The method of claim 1, wherein:
   receiving the image data and the first phase detection data comprises receiving the image data and the first phase detection data from an image sensor, and
   coding the first phase detection data comprises encoding the first phase detection data to determine the second phase detection data; and
the method further comprises:
   transmitting the second phase detection data on a data bus to an image signal processor.

9. The method of claim 1, wherein:
   receiving the image data and the first phase detection data comprises receiving the image data and the first phase detection data from an image sensor through a data bus, and
   coding the first phase detection data comprises decoding the first phase detection data to determine the second phase detection data,
the method further comprises:
   determining a focus position based on the second phase detection data; and
   controlling a lens coupled to the image sensor based on determining the focus position.

10. An apparatus, comprising:
    a memory storing processor-readable code; and
    at least one processor coupled to the memory, the at least one processor configured to execute the processor-readable code to cause the at least one processor to perform operations including:
       receiving image data and first phase detection data corresponding to the image data;
       determining a first channel of the first phase detection data and a second channel of the first phase detection data; and
       coding the first phase detection data to determine second phase detection data by separately coding the first channel and the second channel, wherein coding the first phase detection data comprises:
          determining a focus state; and
          based on at least one criteria involving the focus state, coding the first phase detection data by:
             coding at least one of the first channel or the second channel based on same-channel correlation; or
             coding the at least one of the first channel or the second channel based on cross-channel correlation.

11. The apparatus of claim 10, wherein coding the first phase detection data comprises coding the first phase detection data based on a same-channel correlation of at least one of the first channel or the second channel.

12. The apparatus of claim 10, wherein coding the first phase detection data comprises coding the first phase detection data based on cross-channel correlation between the first channel and the second channel.

13. The apparatus of claim 10, wherein coding the first phase detection data comprises:
    coding the first channel based on same-channel correlation; and
    coding the second channel based on cross-channel correlation of the second channel with the first channel.

14. The apparatus of claim 10, wherein coding the first phase detection data comprises high-pass filtering lower-frequency components below a threshold frequency of the first phase detection data.

15. The apparatus of claim 14, wherein the at least one processor is configured to perform further operations comprising tuning a frequency response of the high-pass filtering by adjusting the threshold frequency based on one or more criteria.

16. The apparatus of claim 15, wherein adjusting the threshold frequency comprises adjusting the threshold frequency based on luminosity of a scene represented by the first phase detection data.

17. The apparatus of claim 10, wherein:
receiving the image data and the first phase detection data comprises receiving the image data and the first phase detection data from an image sensor, and
coding the first phase detection data comprises encoding the first phase detection data to determine the second phase detection data; and
the at least one processor configured to perform further operations comprising:
transmitting the second phase detection data on a data bus to an image signal processor.

18. The apparatus of claim 10, wherein:
receiving the image data and the first phase detection data comprises receiving the image data and the first phase detection data from an image sensor through a data bus, and
coding the first phase detection data comprises decoding the first phase detection data to determine the second phase detection data,
the at least one processor configured to perform further operations comprising:
determining a focus position based on the second phase detection data; and
controlling a lens coupled to the image sensor based on determining the focus position.

19. A non-transitory computer-readable medium storing instructions that, when executed by a processor, cause the processor to perform operations comprising:
receiving image data and first phase detection data corresponding to the image data;
determining a first channel of the first phase detection data and a second channel of the first phase detection data; and
coding the first phase detection data to determine second phase detection data by separately coding the first channel and the second channel, wherein coding the first phase detection data comprises:
determining a focus state; and
based on at least one criteria involving the focus state, coding the first phase detection data by:
coding at least one of the first channel or the second channel based on same-channel correlation; or
coding the at least one of the first channel or the second channel based on cross-channel correlation.

20. The non-transitory, computer-readable medium of claim 19, wherein coding the first phase detection data comprises coding the first phase detection data based on a same-channel correlation of at least one of the first channel or the second channel.

21. The non-transitory, computer-readable medium of claim 19, wherein coding the first phase detection data comprises coding the first phase detection data based on cross-channel correlation between the first channel and the second channel.

22. The non-transitory, computer-readable medium of claim 19, wherein coding the first phase detection data comprises:
coding the first channel based on same-channel correlation; and
coding the second channel based on cross-channel correlation of the second channel with the first channel.

23. An image capture device, comprising: an image sensor comprising a phase detection (PD) compression module, the image sensor configured to output image data and to output corresponding first phase detection (PD) data compressed by the PD compression module; a memory storing processor-readable code; and at least one processor coupled to the memory and to the image sensor, the at least one processor configured to execute the processor-readable code to cause the at least one processor to perform operations comprising: receiving, by the at least one processor from the image sensor over a data bus, the image data and the first phase detection data; determining, by the at least one processor, a first channel of the first phase detection data and a second channel of the first phase detection data; and decompressing, by the at least one processor, the first phase detection data to determine second phase detection data by separately decoding the first channel and the second channel, wherein coding the first phase detection data comprises filtering lower-frequency components below a threshold frequency of the first phase detection data.

24. The image capture device of claim 23, wherein coding the first phase detection data comprises coding the first phase detection data based on a same-channel correlation of at least one of the first channel or the second channel.

25. The image capture device of claim 23, wherein coding the first phase detection data comprises coding the first phase detection data based on cross-channel correlation between the first channel and the second channel.

26. The image capture device of claim 23, wherein the at least one processor is configured to perform further operations comprising adjusting the threshold frequency by adjusting the threshold frequency based on luminosity of a scene represented by the first phase detection data.

27. A method, comprising:
receiving image data and first phase detection data corresponding to the image data;
determining a first channel of the first phase detection data and a second channel of the first phase detection data; and
coding the first phase detection data to determine second phase detection data by separately coding the first channel and the second channel, wherein coding the first phase detection data comprises high-pass filtering lower-frequency components below a threshold frequency of the first phase detection data.

28. An apparatus, comprising:
a memory storing processor-readable code; and
at least one processor coupled to the memory, the at least one processor configured to execute the processor-readable code to cause the at least one processor to perform operations including:
receiving image data and first phase detection data corresponding to the image data;
determining a first channel of the first phase detection data and a second channel of the first phase detection data; and coding the first phase detection data to determine second phase detection data by separately coding the first channel and the second channel, wherein coding the first phase detection data comprises high-pass filtering lower-frequency components below a threshold frequency of the first phase detection data.

\* \* \* \* \*